(12) United States Patent
Ohmi

(10) Patent No.: US 11,722,615 B2
(45) Date of Patent: Aug. 8, 2023

(54) IMAGE PROCESSING INCLUDING ADJUSTING IMAGE ORIENTATION

(71) Applicant: PFU LIMITED, Ishikawa (JP)

(72) Inventor: Kunihiko Ohmi, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 17/711,792

(22) Filed: Apr. 1, 2022

(65) Prior Publication Data
US 2022/0353383 A1 Nov. 3, 2022

(30) Foreign Application Priority Data
Apr. 28, 2021 (JP) ................... 2021-075562

(51) Int. Cl.
*H04N 1/00* (2006.01)
(52) U.S. Cl.
CPC ..... *H04N 1/00809* (2013.01); *H04N 1/00806* (2013.01); *H04N 1/00816* (2013.01)
(58) Field of Classification Search
None
See application file for complete search history.

(56) References Cited

U.S. PATENT DOCUMENTS

| | | | |
|---|---|---|---|
| 9,779,296 B1* | 10/2017 | Ma | G06T 7/11 |
| 2003/0099379 A1* | 5/2003 | Monk | G06V 30/40 |
| | | | 382/218 |
| 2012/0105918 A1* | 5/2012 | Fan | G06V 10/242 |
| | | | 358/448 |
| 2012/0281077 A1* | 11/2012 | Canero Morales | G06V 10/143 |
| | | | 348/61 |
| 2015/0077817 A1 | 3/2015 | Shimazaki et al. | |
| 2016/0110597 A1* | 4/2016 | Solano | G06V 30/413 |
| | | | 382/112 |
| 2017/0220886 A1* | 8/2017 | Cañero Morales | G06V 10/48 |
| 2019/0295341 A1* | 9/2019 | Inoe | G07C 9/15 |
| 2020/0167588 A1 | 5/2020 | Ohara et al. | |
| 2022/0311892 A1* | 9/2022 | Itoh | G06V 30/413 |

FOREIGN PATENT DOCUMENTS

| | | |
|---|---|---|
| JP | 2014-071784 A | 4/2014 |
| JP | 6161484 B2 | 7/2017 |
| JP | 2019-179342 A | 10/2019 |
| JP | 2020-086847 A | 6/2020 |

* cited by examiner

*Primary Examiner* — Dung D Tran
(74) *Attorney, Agent, or Firm* — McDermott Will & Emery LLP

(57) ABSTRACT

To provide an image processing apparatus capable of correcting an orientation of a scanned image, even if the orientation of a document during scanning is incorrect. An image processing apparatus includes a document type determination unit configured to determine a document type of image data obtained by optical reading, a selection unit configured to select, based on a determination result from the document type determination unit, a determination algorithm to be applied, from a plurality of determination algorithms for determining an orientation of an image, and an orientation determination unit configured to determine an orientation of an image in the image data by using the determination algorithm selected by the selection unit.

8 Claims, 11 Drawing Sheets

IMAGE PROCESSING SYSTEM 1

EXAMPLE OF FAILED
CHARACTER STRING GROUPING

EXAMPLE OF SUCCESSFUL
CHARACTER STRING GROUPING

CHARACTERS LIKELY TO BE
ERRONEOUSLY DETERMINED BY OCR

EXAMPLES WITH DIFFICULT CHARACTER STRING
EXTRACTION DUE TO DESIGN PATTERN

IMAGE PROCESSING APPARATUS 2

IMAGE PROCESSING (S10)

FIG. 7

| DOCUMENT TYPE DETERMINATION RESULT | ASPECT RATIO DETERMINATION RESULT | ROTATION PRIORITY ORDER | | | | ORIENTATION DETERMINATION ALGORITHM |
|---|---|---|---|---|---|---|
| | | 0 DEGREES | 90 DEGREES | 180 DEGREES | 270 DEGREES | |
| TD1 (CARD) | HORIZONTAL LENGTH | 1 | ... | 2 | ... | ALGO 1 MRZ ORIENTATION DETECTION |
| | VERTICAL LENGTH | ... | 1 | ... | 2 | |
| TD3 (PASSPORT) (SIZE WHEN OPENED) | HORIZONTAL LENGTH | ... | 1 | ... | 2 | ALGO 1 MRZ ORIENTATION DETECTION |
| | VERTICAL LENGTH | 1 | ... | 2 | ... | |
| OTHER DOCUMENTS | ... | 1 | 2 | 3 | 4 | ALGO 2 OCR ORIENTATION DETECTION |

{ ROTATION PROCESSING PRIORITY ORDER LIST } { ORIENTATION DETECTION ALGORITHM SELECTION INFORMATION }

MRZ SEARCH PROCESS (S30)

IMAGE PROCESSING INCLUDING ADJUSTING IMAGE ORIENTATION

CROSS-REFERENCE TO RELATED APPLICATIONS

This application is based on and claims priority under 35 USC 119 from Japanese Patent Application No. 2021-075562 filed Apr. 28, 2021.

FIELD

The present invention relates to an image processing apparatus, an image processing method, and a program.

BACKGROUND

For example, Japanese Patent No. 6161484 discloses an image processing apparatus including an input image acquisition unit 161 that acquires an input image generated by reading a document, a character string information calculation unit 168 that calculates a character string density or a character string variance in the input image, and a document type identification unit 169 that identifies a type of the document, based on the character string density or the character string variance.

Furthermore, Japanese Unexamined Patent Application Publication No. 2020-086847 discloses an image processing apparatus 200 including a storage unit 210 that stores a position of a predetermined region in an image conforming to a predetermined format, an image acquisition unit 221 that acquires an input image including a character recognition target region, a corrected image generation unit 223 that cuts out a region corresponding to the character recognition target region from the input image or an image generated from the input image, to generate a corrected image in which the region is arranged at the position of the predetermined region in the image conforming to the predetermined format, a character detection unit 224 that detects a character from the corrected image, and an output unit 203 that outputs information about the detected character.

SUMMARY OF THE INVENTION

An object is to provide an image processing apparatus capable of correcting an orientation of a scanned image, even if the orientation of a document during scanning is incorrect.

An image processing apparatus according to the present invention includes a document type determination unit configured to determine a document type of image data obtained by optical reading, a selection unit configured to select, based on a determination result from the document type determination unit, a determination algorithm to be applied, from a plurality of determination algorithms for determining an orientation of an image, and an orientation determination unit configured to determine an orientation of an image in the image data by using the determination algorithm selected by the selection unit.

Preferably, the image processing apparatus further includes a region extraction unit configured to extract, from the image data, an image region corresponding to a document, and the document type determination unit determines the document type, based on a size or a shape of the image region extracted by the region extraction unit.

Preferably, the image processing apparatus further includes an MRZ search unit configured to search the image data for a machine readable zone defined by the International Civil Aviation Organization, and the document type determination unit determines the document type, based on a search result from the MRZ search unit.

Preferably, the document type determination unit determines whether or not the document of the image data is a travel document, and if the document type determination unit determines that the document of the image data is a travel document, the selection unit selects a determination algorithm for searching for a machine readable zone while rotating the image data by 90 degrees.

Preferably, if the document type determination unit determines that the document of the image data is not a travel document, the selection unit selects a determination algorithm for performing an optical character recognition process by rotating the image data by 90 degrees, 180 degrees, and 270 degrees.

Preferably, the image processing apparatus further includes a binarization unit configured to generate a binary image by performing a binarization process on image data of the image region extracted by the region extraction unit, the document type determination unit determines the document type by using the binary image generated by the binarization unit, the orientation determination unit determines an orientation of an image in the image data by using the binary image generated by the binarization unit, and the image processing apparatus further includes an original image rotation unit configured to rotate the image data in accordance with a determination result from the orientation determination unit.

Preferably, the image processing apparatus further includes a front-back inversion unit configured to invert, when receiving an input of a plurality of pieces of image data read by duplex scanning, front and back images, based on the determination result from the orientation determination unit.

Preferably, the image processing apparatus further includes an angle selection unit configured to select a rotation angle in a priority order corresponding to the document type determined by the document type determination unit, and the orientation determination unit determines the orientation of the image, based on image data rotated at the rotation angle selected by the angle selection unit.

An image processing method according to the present invention includes determining a document type of image data obtained by optical reading, selecting, based on a determination result in the determining of the document type, a determination algorithm to be applied, from a plurality of determination algorithms for determining an orientation of an image, and determining an orientation of an image in the image data by using the determination algorithm selected in the selecting.

A program according to the present invention includes causing a computer to execute, determining a document type of image data obtained by optical reading, selecting, based on a determination result in the determining of the document type, a determination algorithm to be applied, from a plurality of determination algorithms for determining an orientation of an image, and determining an orientation of an image in the image data by using the determination algorithm selected in the selecting.

Advantageous Effects of Invention

An object is to provide an image processing apparatus capable of correcting an orientation of a scanned image, even if the orientation of a document during scanning is incorrect.

BRIEF DESCRIPTION OF THE DRAWINGS

FIG. 7 is a table showing determination algorithms and a priority order of rotation angles corresponding to document types.

DESCRIPTION OF THE EMBODIMENTS

[Background]

The background of the present invention will be described.

In situations where travelers from overseas are received at hotels and the like and identity verification is performed for the travelers, a document scanner at a reception desk may be used to scan certificates such as passports and ID cards to acquire customer information. Such customer information may be useful to the hotel in terms of management and security.

That is, a scanner may be used to execute OCR recognition for a scanned image of a certificate and acquire personal information such as a customer's name.

A certificate used in such an operation is a so-called travel document and includes a character string region (machine readable region) dedicated to OCR, which is generally called a machine readable zone (MRZ).

Travel documents are documents that generally follow the regulations of each country and have specifications such as document dimensions, a position of the MRZ region, and a number of columns and characters of the MRZ that are internationally unified by the International Civil Aviation Organization (ICAO) and the like.

Certificates carried by travelers and often used at counters include ID cards (TD1) and passports (TD3) (hereinafter referred to as TD1 and TD3).

In TD1 and TD3 documents, the document size, the MRZ position and dimensions, and the like are in accordance with the specified standards. However, the background design, the color, and the arrangement and color of identification character information other than the MRZ are chosen freely by each country.

In addition, personal authentication is basically an ad-hoc operation at a counter, and when an operator uses a scanner or the like, the scanning direction (document setting direction) and orientation (front and back orientation) may be incorrect.

Furthermore, considering a case of an unmanned reception and the like in which a traveler operates a scanner by himself/herself, guard for scanning performed in an incorrect way as described above should be taken into account more.

In the reception operation, the scanner may also be used for other operations, and thus time and effort are needed to switch scan modes to be used for each reception of a traveler.

In order to avoid the effort of such switching, it is effective if the scanner automatically recognizes that a document is a travel document.

Figure 1:
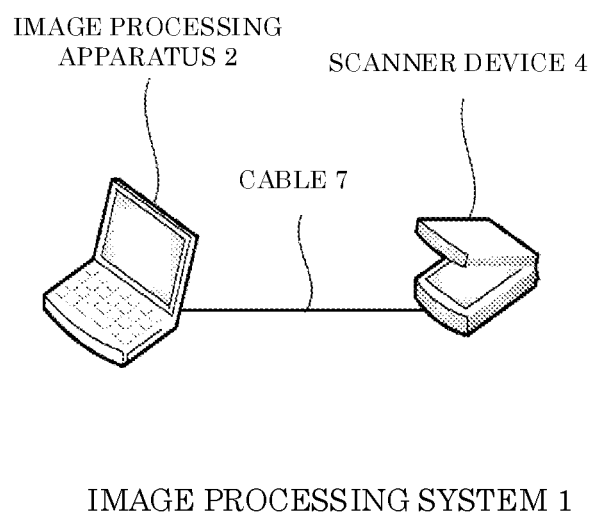
FIG. 1 is a diagram illustrating an overall configuration of an image processing system 1.

FIG. 1 is a diagram illustrating an overall configuration of an image processing system 1.

As illustrated in FIG. 1, the image processing system 1 includes an image processing apparatus 2 and a scanner device 4, which are connected to each other via a cable 7. In the present example, an aspect in which the cable 7 such as a USB cable is used for the connection will described as a specific example. However, the connection is not limited thereto, and a wireless connection may be used, for example. Furthermore, the scanner device 4 may have a function of the image processing apparatus 2 inside a housing of the scanner device 4.

The image processing apparatus 2 is a computer terminal and processes image data read by the scanner device 4. Specifically, the image processing apparatus 2 determines an orientation of an image for the image data optically read by the scanner device 4, and rotates the image data so that the image is oriented upright.

The scanner device 4 is an optical image reading device.

FIGS. 2A and 2B and 3A and 3B are diagrams for explaining a problem in an automatic recognition process of a travel document.

In an orientation determination method based on an OCR process, extraction of character string is a key factor. However, in the MRZ region of TD1 and TD3, the following determination errors may occur, and thus, when only TD1 and TD3 are considered, the orientation determination accuracy is not high.

Figure 2A:
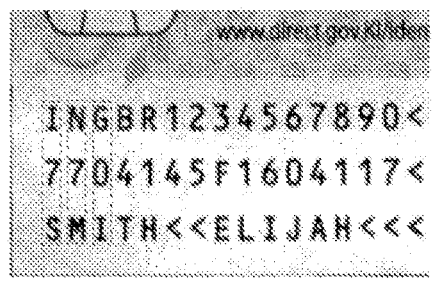
FIG. 2A is a diagram illustrating an example of a failed grouping of character strings in an MRZ.
Figure 2B:
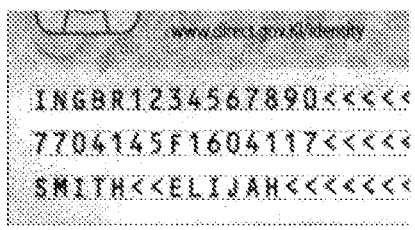
FIG. 2B is a diagram illustrating an example of a successful grouping of character strings in an MRZ.

That is, as illustrated in FIG. 2A, the vertical direction and the horizontal direction may be mistaken in the grouping of a combination of character strings. Character strings are grouped by the feature that characters therein are arranged in an orderly manner. However, as illustrated in FIG. 2A, in the MRZ region, mistakes easily occur, because the characters are orderly arranged in both the vertical and horizontal directions. Such orderly arrangement of character strings in the MRZ region is due to the fact that the number of characters is fixed and proportional fonts are not used (character spacing is constant).

Figure 3A:
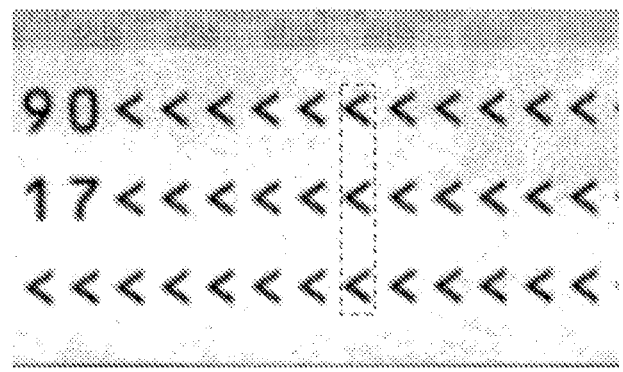
FIG. 3A is a diagram illustrating a reason for erroneous determination in an OCR process in the MRZ.

As illustrated in FIG. 3A, the "<" character is often used in the MRZ region. This character is used as a complementary, ineffective character to fill the number of characters for the characters of the MRZ region. "<" is erroneously determined as "VVV" or "^^^" in an OCR process, and thus, easily causes erroneous detection of the orientation.

Figure 3B:
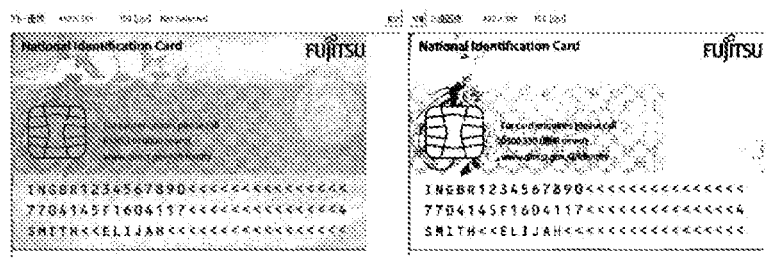
FIG. 3B is a diagram illustrating an example of various design patterns adopted for the background of the characters, which makes it generally difficult to extract character strings.

Furthermore, TD1 and TD3 are personal certificates, and thus, as illustrated in FIG. 3B, various design patterns and the like are adopted for the background of the characters, which makes it generally difficult to extract character strings. Moreover, when background patterns are removed to perform the OCR process, the processing time increases.

Therefore, the image processing apparatus 2 of the present embodiment determines a document type of the scanned image data, and uses a determination algorithm corresponding to the document type to determine the orientation of the image in the image data. The determination algorithm is, for example, an algorithm for searching for the MRZ region and an algorithm for executing the OCR process.

Figure 4:
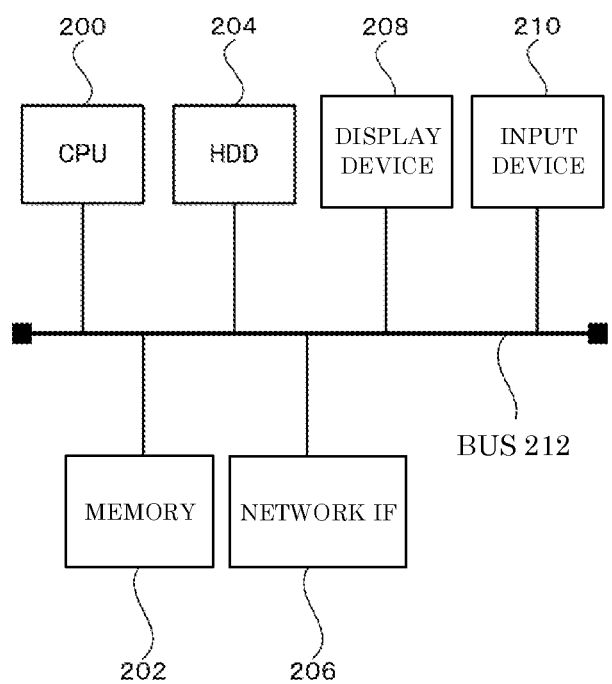
FIG. 4 is a diagram illustrating a hardware configuration of an image processing apparatus 2.

FIG. 4 is a diagram illustrating a hardware configuration of the image processing apparatus 2.

As illustrated in FIG. 4, the image processing apparatus 2 includes a CPU 200, a memory 202, an HDD 204, a network interface 206 (network IF 206), a display device 208, and an input device 210. These components are connected to one another via a bus 212.

The CPU 200 is a central processing unit, for example.

The memory 202 is a volatile memory, for example, and functions as a main storage device.

The HDD 204 is a hard disk drive device, for example, and serves as a non-volatile recording device to store a computer program (an image processing program 3 in FIG. 5, for example) and other data files.

The network IF 206 is an interface for wire or wireless communication and realizes communication with the scanner device 4, for example.

The display device 208 is a liquid crystal display, for example.

The input device 210 is a keyboard or a mouse, for example.

Figure 5:
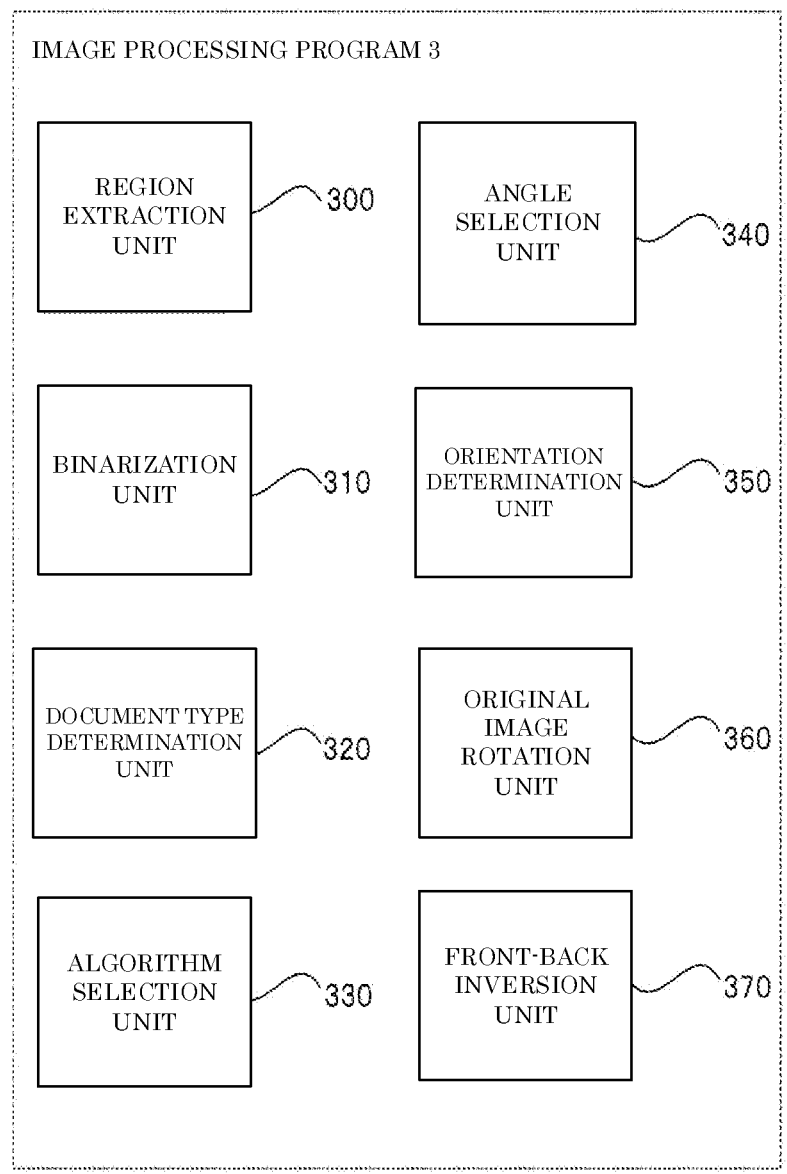
FIG. 5 is a diagram illustrating a functional configuration of the image processing apparatus 2.

FIG. 5 is a diagram illustrating a functional configuration of the image processing apparatus 2.

As illustrated in FIG. 5, the image processing program 3 is installed in the image processing apparatus 2.

The image processing program 3 includes a region extraction unit 300, a binarization unit 310, a document type determination unit 320, an algorithm selection unit 330, an angle selection unit 340, an orientation determination unit 350, an original image rotation unit 360, and a front-back inversion unit 370.

The image processing program 3 may be partially or completely implemented by hardware such as an ASIC, or may be implemented by partially utilizing a function of an operating system (OS).

In the image processing program 3, the region extraction unit 300 extracts an image region corresponding to a document from image data scanned by the scanner device 4. For example, a (monochrome) backing is used to provide an even background color fora region other than the document, and the region extraction unit 300 extracts only a document portion from the image including the backing background.

The region extraction unit 300 may extract, from the scanned image, as the document portion, a region (content region) corresponding to a content. This is because an image region obtained as the content region added with a margin (blank space) around the content region is considered as a document region. In this case, even if a copied document obtained by copying a travel document is scanned by the scanner device 4, an image can be extracted from the shape and size of the travel document, rather than the shape and size of the copy sheet.

The binarization unit 310 performs binarization process on the image data of the image region extracted by the region extraction unit 300, to generate a binary image. A threshold value of the binarization process is, for example, a density value at which the background pattern can be removed and characters can be left.

The binarization unit 310 may perform a binarization process and a resolution reduction process on the image data of the image region extracted by the region extraction unit 300, to generate a binary image having a lower resolution than the original image. This makes it possible to reduce the processing load of a document type identification process and an image orientation determination process.

The document type determination unit 320 uses the binary image generated by the binarization unit 310 to determine a document type of the image data. The document type to be determined indicates, for example, whether or not a document is a travel document. Based on the size and shape of the binary image generated by the binarization unit 310, the document type determination unit 320 of the present example determines whether the document of the scanned image data has the size of a TD1 card, the size of an opened TD3 passport, or another size.

Based on a determination result from the document type determination unit 320, the algorithm selection unit 330 selects a determination algorithm to be applied, from a plurality of determination algorithms for determining an orientation of an image. As illustrated in FIG. 7, when the document type determination unit 320 determines that the document is a TD1 or a TD3 document, the algorithm selection unit 330 of the present example selects an algorithm ("algo 1") for searching for the MRZ region while rotating the image data, and when the document type determination unit 320 determines that the document is a document other than the TD1 or the TD3 document, the algorithm selection unit 330 selects an algorithm ("algo 2") for performing an OCR process while rotating the image data.

The angle selection unit 340 selects rotation angles in a priority order corresponding to the document type determined by the document type determination unit 320. As illustrated in FIG. 7, the angle selection unit 340 of the present example selects the rotation angles according to the document type determined by the document type determination unit 320 and the priority order corresponding to the shape (aspect ratio) of the region extracted by the region extraction unit 300. As illustrated in FIG. 7, when the document is a travel document (TD1 or TD3), the orientation determination unit 350 may complete the determination process by using two rotation angles. When the document is not a travel document, the orientation determination unit 350 rotates the image data in a predetermined order (0 degrees, 90 degrees, 180 degrees, and 270 degrees).

The orientation determination unit 350 uses the determination algorithm selected by the algorithm selection unit 330 to determine the orientation of the image in the image data. The orientation determination unit 350 of the present example performs an MRZ region search process or an OCR process on the image data rotated at the rotation angle selected by the angle selection unit 340 according to the algorithm selected by the algorithm selection unit 330, to determine the orientation of the image in the image data.

The original image rotation unit 360 rotates original image data acquired from the scanner device 4, according to a determination result from the orientation determination unit 350.

Figure 8:
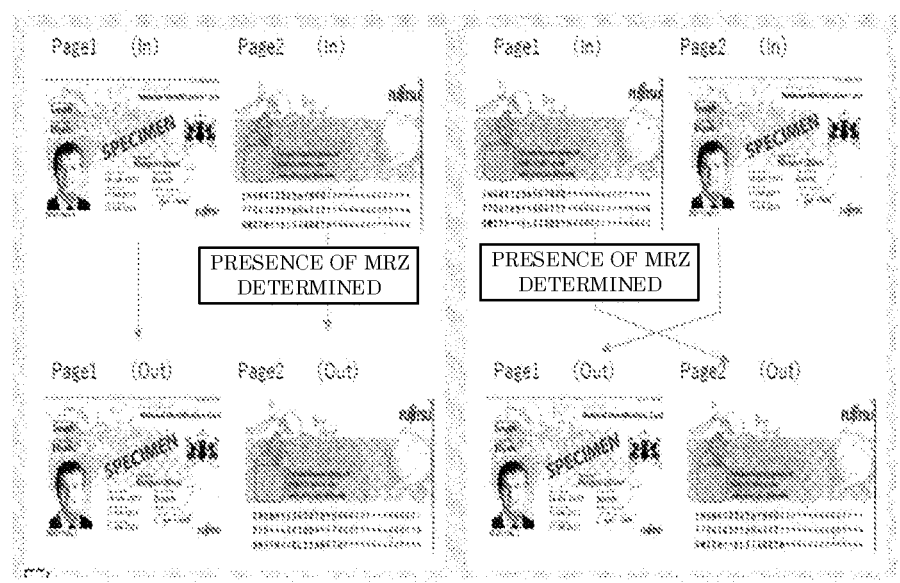
FIG. 8 is a diagram for describing a front-back inversion process.

When receiving an input of a plurality of pieces of image data read by duplex scanning, the front-back inversion unit 370 inverts front and back images, based on the determination result from the orientation determination unit 350. For example, when the document type determination unit 320 determines that a document of image data read by duplex scanning is a TD1 document, the front-back inversion unit 370 inverts, as illustrated in FIG. 8, the front and back images so that image data in which the MRZ region is discovered by the orientation determination unit 350 is on the back side.

Figure 6:
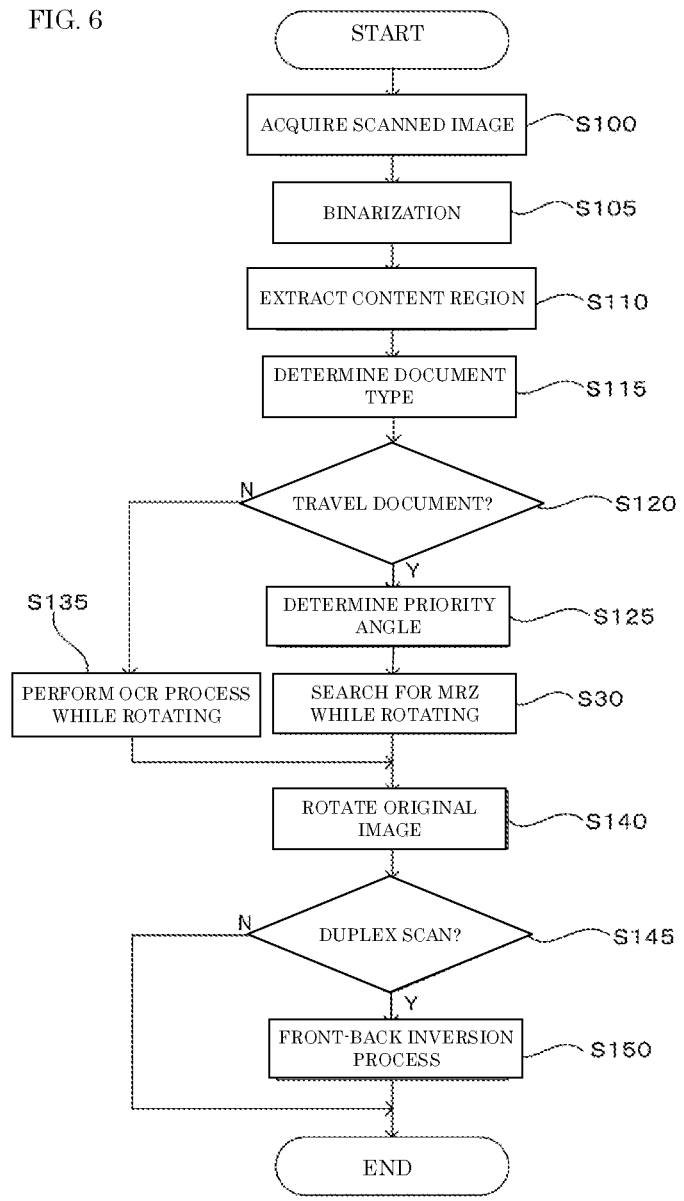
FIG. 6 is a flowchart for describing image processing (S10) by the image processing apparatus 2.

FIG. 6 is a flowchart for describing image processing (S10) by the image processing apparatus 2.

As illustrated in FIG. 6, in step 100 (S100), the image processing apparatus 2 (the image processing program 3 in FIG. 5) acquires image data scanned by the scanner device 4.

In step 105 (S105), the binarization unit 310 of the image processing program 3 performs a binarization process on the image data acquired from the scanner device 4 to generate a binary image.

In step 110 (S110), the region extraction unit 300 determines, from the binary image generated by the binarization unit 310, a region where a predetermined amount or more of black pixels are present as a content region, and extracts the content region.

In step 115 (S115), the document type determination unit 320 determines whether the document of the image data is a TD1 or a TD3 document, or another document, based on the shape and the size of the content region extracted by the region extraction unit 300.

In step 120 (S120), when the document type determination unit 320 determines that the document of the image data is a travel document (TD1 or TD3), the image processing program 3 proceeds to the process of S125, and when the document type determination unit 320 determines that the document is a document other than a travel document, the image processing program 3 proceeds to the process of S135.

In step 125 (S125), as illustrated in FIG. 7, the angle selection unit 340 determines a priority order of the rotation angles, based on the document type (TD1 or TD3) determined by the document type determination unit 320 and the aspect ratio of the content region extracted by the region extraction unit 300.

In step 30 (S30), the algorithm selection unit 330 selects an algorithm (algo 1) for searching for the MRZ region while rotating the image data to determine the orientation of the image, and the orientation determination unit 350 determines the orientation of the image in the image data, according to the selected algorithm. It is noted that, instead of rotating the image data, coordinate information of the MRZ may be rotated to search for the MRZ region. Furthermore, in S30, if the MRZ region is not discovered in any rotation direction, the processing may proceed to S135.

In step 135 (S135), the algorithm selection unit 330 selects an algorithm (algo 2) for performing the OCR process while rotating the image data to determine the orientation of the image. The orientation determination unit 350 performs an OCR process on the image data rotated by 0 degrees, the image data rotated by 90 degrees, the image data rotated by 180 degrees, and the image data rotated by 270 degrees, according to the selected algorithm, and determines the orientation of the image, based on the accuracy of the optical character recognition process.

In step 140 (S140), the original image rotation unit 360 rotates the original image data acquired from the scanner device 4, based on the determination result from the orientation determination unit 350 to obtain image data in which the image is in an upright state.

In step 145 (S145), when the front-back inversion unit 370 acquires image data obtained from duplex scanning by the scanner device 4 and the document type determination unit 320 determines that the document is a TD1 document, processing proceeds to the process of S150, and otherwise, the image processing (S10) is terminated.

In step 150 (S150), the front-back inversion unit 370 inverts the front and back side (order) of the image of the image data obtained by duplex scanning, so that the image data in which the MRZ region is discovered by the orientation determination unit 350 is the image data on the back side.

Figure 9:
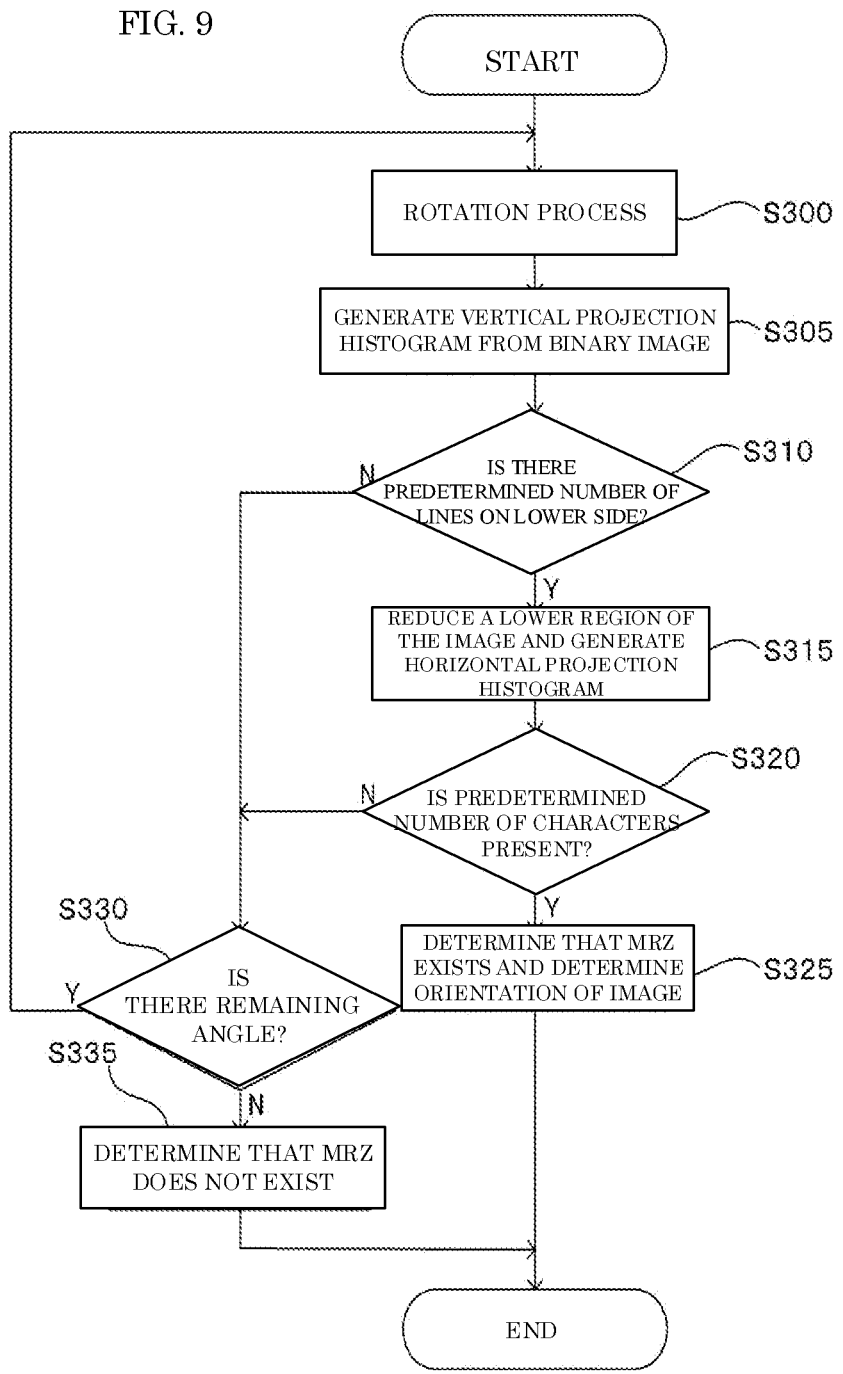
FIG. 9 is a flowchart for describing an MRZ search process (S30) in more detail.

FIG. 9 is a flowchart for describing the MRZ search process (S30) in more detail.

As illustrated in FIG. 9, in step 300 (S300), the orientation determination unit 350 rotates the binary image generated by the binarization unit 310 at a rotation angle of priority order 1 determined by the angle selection unit 340. It is noted that, if the rotation angle is 0 degrees, the rotation process is not performed.

Figure 10:
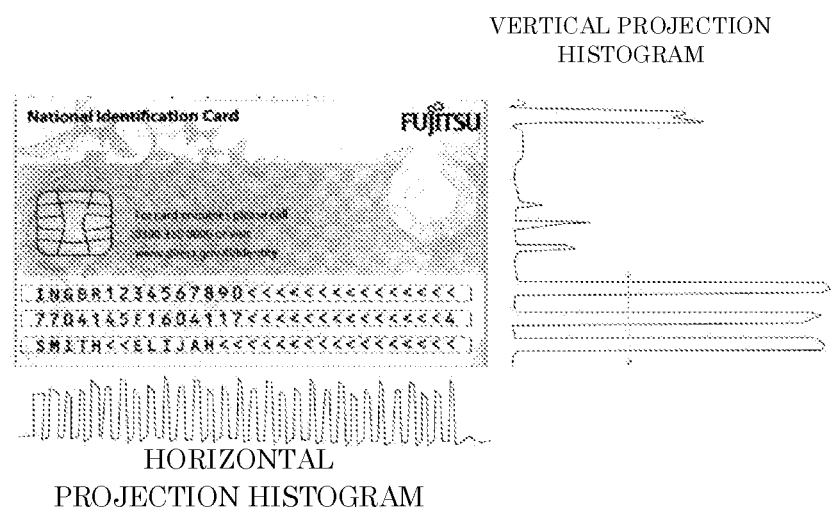
FIG. 10 is a diagram illustrating a projection histogram.

In step 305 (S305), the orientation determination unit 350 generates a vertical histogram of projected black pixels from the rotated binary image, as illustrated in FIG. 10.

In step 310 (S310), as illustrated in FIG. 10, the orientation determination unit 350 determines whether or not pixels of character strings including a predetermined number of lines at a predetermined interval exist at a lower side of the image in the generated vertical projection histogram, and if these pixels exist, the processing proceeds to the process of S315, and otherwise, the processing proceeds to the process of S330. The predetermined number of lines is, for example, three lines in the case of TD1 and two lines in the case of TD3.

In step 315 (S315), the orientation determination unit 350 generates, from the binary image, only for a lower region of the image (a region where the pixels including the predetermined number of lines exist), a horizontal histogram of projected black pixels, as illustrated in FIG. 10.

In step 320 (S320), as illustrated in FIG. 10, the orientation determination unit 350 determines whether or not pixels corresponding to a predetermined number of characters exist in the generated horizontal projection histogram, and if these pixels exist, the processing proceeds to the process of S325, and otherwise, the processing proceeds to the process of S330. For example, the predetermined number of characters is 30 characters in the case of TD1 and 44 characters in the case of TD3.

In step 325 (S325), the orientation determination unit 350 determines that the MRZ region exists, and determines the orientation of the image, based on the angle at which the binary image is rotated.

In step 330 (S330), if there is a subsequent rotation angle in the priority order determined by the angle selection unit 340, the orientation determination unit 350 returns to the process of S300 and performs the processes of S300 to S325 at the subsequent rotation angle in the priority order. If there is no subsequent rotation angle in the priority order determined by the angle selection unit 340, the orientation determination unit 350 proceeds to the process of S335.

In step 335 (S335), the orientation determination unit 350 determines that there is no MRZ region.

As described above, according to the image processing system 1 of the present embodiment, it is possible to determine a document type of image data scanned by the scanner device 4, and to determine the orientation of an image in the image data by using an algorithm corresponding to the document type. In particular, switching algorithms depending on whether or not the document type is a travel document makes it possible to avoid erroneous determination such as illustrated in FIGS. 2A and 3A, and to improve the determination accuracy.

Modification

Next, a modification of the above-described embodiment will be described.

Figure 11:
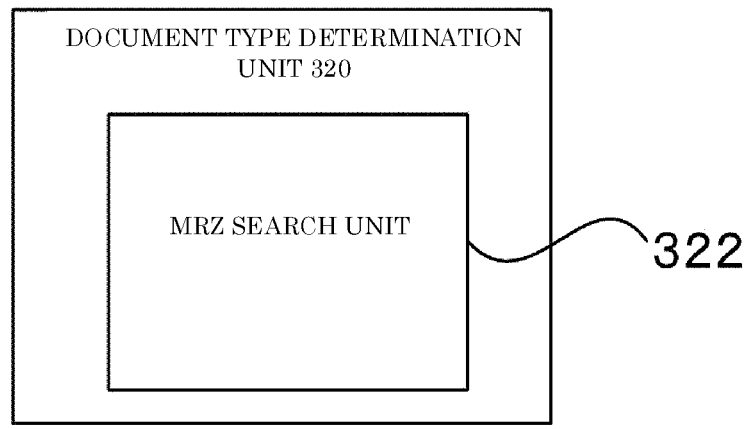
FIG. 11 is a diagram for describing a modification of a document type determination unit 320.

FIG. 11 is a diagram for describing a modification of the document type determination unit 320.

As illustrated in FIG. 11, the document type determination unit 320 in the modification includes an MRZ search unit 322. The MRZ search unit 322 determines whether or not the MRZ region exists, by a processing similar to the one in FIG. 9. The document type determination unit 320 of the modification determines a document type, based on a search result from the MRZ search unit 322.

In the embodiment described above, when the document is a travel document, the orientation determination unit 350 searches for the MRZ region to determine the orientation of the image. However, the configuration is not limited thereto and a ruled line structure may be analyzed to determine the orientation of the image, for example.

The priority order of the rotation angles may be determined in order from a rotation angle having the highest probability in consideration of the tendencies of document setting to the scanner device 4. For example, when the scanner device 4 is provided with a marking or a sticker indicating a document setting method, the priority order in the direction of the document setting method may be set to 1.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

REFERENCE SIGNS LIST

1 Image processing system
2 Image processing apparatus
3 Image processing program
4 Scanner device
300 Region extraction unit
310 Binarization unit
320 Document type determination unit
330 Algorithm selection unit
340 Angle selection unit
350 Orientation determination unit
360 Original image rotation unit
370 Front-back inversion unit

What is claimed is:

1. An image processing apparatus comprising a processor configured to:
extract, from image data obtained by optical reading, an image region corresponding to a document;
determine that the document of the image data is a travel document based on a size or a shape of the extracted image region;
select a determination algorithm for searching for a machine readable zone while rotating the image data by 90 degrees, from a plurality of determination algorithms for determining an orientation of an image, in response to determining that the document of the image data is the travel document; and
determine an orientation of an image in the image data by using the selected determination algorithm.

2. The image processing apparatus according to claim 1, wherein the processor is further configured to:
search the image data for a machine readable zone defined by the International Civil Aviation Organization, and
determine the document type, based on a result of the search.

3. The image processing apparatus according to claim 1, wherein the processor is further configured to:
select a determination algorithm for performing an optical character recognition process by rotating the image data by 90 degrees, 180 degrees, or 270 degrees, in response to determining that the document of the image data is not the travel document.

4. The image processing apparatus according to claim 3, wherein the processor is further configured to:
generate a binary image by performing a binarization process on image data of the extracted image region;
determine the document type by using the generated binary image;
determine an orientation of an image in the image data by using the generated binary image; and
rotate the image data in accordance with a determination result of the orientation of the image.

5. The image processing apparatus according to claim 4, wherein the processor is further configured to:
swap, based on the determination result, when receiving an input of a plurality of pieces of image data read by duplex scanning, front and back images.

6. An image processing method comprising the steps of:
extracting, from image data obtained by optical reading, an image region corresponding to a document;
determining that the document of the image data is a travel document based on a size or a shape of the extracted image region;
selecting a determination algorithm for searching for a machine readable zone while rotating the image data by 90 degrees, from a plurality of determination algorithms for determining an orientation of an image, in response to determining that the document of the image data is the travel document; and
determining an orientation of an image in the image data by using the selected determination algorithm.

7. A non-transitory computer-readable recording medium storing thereon a computer program that causes a computer to perform a method comprising:
extracting, from image data obtained by optical reading an image region corresponding to a document;
determining that the document of the image data is a travel document based on a size or a shape of the extracted image region;
selecting a determination algorithm for searching for a machine readable zone while rotating the image data by 90 degrees, from a plurality of determination algorithms for determining an orientation of an image, in response to determining that the document of the image data is the travel document; and
determining an orientation of an image in the image data by using the selected determination algorithm.

8. An image processing apparatus comprising a processor configured to:
- determine a document type of image data obtained by optical reading;
- select a rotation angle in a priority order corresponding to the determined document type;
- select, based on the document type of the determination, a determination algorithm to be applied, from a plurality of determination algorithms for determining an orientation of an image; and
- determine an orientation of an image in the image data by using the selected determination algorithm, based on image data rotated at the selected rotation angle.

* * * * *